(12) United States Patent
Higbee et al.

(10) Patent No.: US 8,615,807 B1
(45) Date of Patent: Dec. 24, 2013

(54) SIMULATED PHISHING ATTACK WITH SEQUENTIAL MESSAGES

(71) Applicant: PhishMe, Inc., Chantilly, VA (US)

(72) Inventors: Aaron Higbee, Leesburg, VA (US); Rohyt Belani, New York, NY (US); Scott Greaux, Glenmont, NY (US)

(73) Assignee: PhishMe, Inc., Chantilly, VA (US)

( * ) Notice: Subject to any disclaimer, the term of this patent is extended or adjusted under 35 U.S.C. 154(b) by 0 days.

(21) Appl. No.: 13/785,127

(22) Filed: Mar. 5, 2013

Related U.S. Application Data

(63) Continuation of application No. 13/763,486, filed on Feb. 8, 2013.

(51) Int. Cl.
*G06F 17/30* (2006.01)
*G06F 11/00* (2006.01)
*G06F 12/14* (2006.01)

(52) U.S. Cl.
USPC ............... 726/25; 726/22; 726/23; 726/24; 726/26

(58) Field of Classification Search
None
See application file for complete search history.

(56) References Cited

U.S. PATENT DOCUMENTS

| | | | |
|---|---|---|---|
| 5,892,903 A | 4/1999 | Klaus | |
| 6,954,858 B1 | 10/2005 | Welborn et al. | |
| 7,281,031 B1 | 10/2007 | Wang et al. | |
| 7,325,252 B2 | 1/2008 | Bunker et al. | |
| 7,373,385 B2 | 5/2008 | Prakash | |
| 7,457,823 B2 | 11/2008 | Shraim et al. | |
| 7,490,356 B2 | 2/2009 | Lieblich et al. | |
| 7,509,675 B2 | 3/2009 | Aaron | |
| 7,603,709 B2 | 10/2009 | Lewis et al. | |
| 7,617,532 B1 | 11/2009 | Alexander et al. | |
| 7,634,810 B2 * | 12/2009 | Goodman et al. | 726/22 |

(Continued)

FOREIGN PATENT DOCUMENTS

| | | |
|---|---|---|
| JP | 2006-285844 A | 10/2006 |
| JP | 2007-323640 A | 12/2007 |
| WO | 2011/017196 A2 | 2/2011 |
| WO | 2012/068255 A2 | 5/2012 |

OTHER PUBLICATIONS

Ponnurangam Kumaraguru, et al., "Protecting People from Phishing: The Design and Evaluation of an Embedded Training Email System", Institute for Software Research, Human Computer Interaction Institute, Heinz School of Public Policy, Engineering and Public Policy, Carnegie Mellon University, 2007, 10 pages.

(Continued)

*Primary Examiner* — Cordelia Zecher
*Assistant Examiner* — Trang Doan
(74) *Attorney, Agent, or Firm* — Fahmi, Sellers, Embert & Davitz (57) ABSTRACT

Described herein are methods, network devices and machine-readable storage media for conducting simulated phishing attacks on an individual so as to educate the individual about the various ways in which phishing attacks may be disguised. Specifically described is a simulated phishing attack involving a sequence of messages. At least one of the messages has an associated target action that would ordinary, if the attack were an actual phishing attack, result in the individual's personal information and/or computing device becoming compromised. In the simulated phishing attack, no malicious action is actually performed. At least one of the other messages is designed to draw attention to the message with the target action.

14 Claims, 3 Drawing Sheets

(56) References Cited

U.S. PATENT DOCUMENTS

| | | |
|---|---|---|
| 7,668,921 B2 | 2/2010 | Proux et al. |
| 7,681,234 B2 | 3/2010 | Florencio et al. |
| 7,685,631 B1 | 3/2010 | Paya et al. |
| 7,788,723 B2 | 8/2010 | Huddleston |
| 7,841,003 B1 | 11/2010 | Emdee |
| 7,865,958 B2 | 1/2011 | Lieblich et al. |
| 7,904,518 B2 | 3/2011 | Marino et al. |
| 7,925,883 B2 | 4/2011 | Florencio et al. |
| 7,971,246 B1 | 6/2011 | Emigh et al. |
| 7,987,495 B2 | 7/2011 | Maler et al. |
| 8,181,232 B2 | 5/2012 | Grandcolas et al. |
| 8,191,148 B2 | 5/2012 | Oliver et al. |
| 8,209,381 B2 | 6/2012 | Sinn et al. |
| 8,220,047 B1 | 7/2012 | Soghoian et al. |
| 8,271,007 B2 * | 9/2012 | Cai et al. ............... 455/466 |
| 8,286,249 B2 | 10/2012 | Adelstein et al. |
| 8,291,065 B2 | 10/2012 | Goodman et al. |
| 8,321,934 B1 | 11/2012 | Cooley et al. |
| 8,365,246 B2 | 1/2013 | Readshaw |
| 8,381,293 B2 | 2/2013 | Emigh et al. |
| 8,407,798 B1 | 3/2013 | Lotem et al. |
| 8,423,483 B2 | 4/2013 | Sadeh-Koniecpol et al. |
| 8,438,642 B2 | 5/2013 | Feng et al. |
| 8,464,346 B2 | 6/2013 | Barai et al. |
| 8,464,352 B2 | 6/2013 | Toomey |
| 8,468,244 B2 | 6/2013 | Redlich et al. |
| 8,484,741 B1 | 7/2013 | Chapman |
| 2002/0091940 A1 | 7/2002 | Welborn et al. |
| 2005/0132225 A1 | 6/2005 | Gearhart |
| 2005/0183143 A1 | 8/2005 | Anderholm et al. |
| 2006/0174119 A1 | 8/2006 | Xu |
| 2006/0271631 A1 | 11/2006 | Qureshi et al. |
| 2007/0107053 A1 | 5/2007 | Shraim et al. |
| 2007/0136806 A1 | 6/2007 | Berman |
| 2007/0192855 A1 | 8/2007 | Hulten et al. |
| 2007/0245422 A1 | 10/2007 | Hwang et al. |
| 2007/0250618 A1 | 10/2007 | Hammond |
| 2007/0294352 A1 | 12/2007 | Shraim et al. |
| 2008/0037791 A1 | 2/2008 | Jakobsson |
| 2008/0047017 A1 | 2/2008 | Renaud |
| 2008/0052359 A1 | 2/2008 | Golan et al. |
| 2008/0141342 A1 | 6/2008 | Curyn |
| 2008/0271124 A1 | 10/2008 | Nisbet et al. |
| 2008/0288330 A1 | 11/2008 | Hildebrand et al. |
| 2009/0089859 A1 | 4/2009 | Cook et al. |
| 2009/0144308 A1 | 6/2009 | Huie et al. |
| 2009/0172772 A1 | 7/2009 | Souille |
| 2009/0241168 A1 | 9/2009 | Readshaw |
| 2009/0241173 A1 | 9/2009 | Troyansky |
| 2009/0265430 A1 | 10/2009 | Bechtel et al. |
| 2009/0319647 A1 | 12/2009 | White et al. |
| 2009/0320137 A1 | 12/2009 | White et al. |
| 2009/0328208 A1 | 12/2009 | Peters |
| 2010/0017616 A1 | 1/2010 | Nichols et al. |
| 2010/0043071 A1 | 2/2010 | Wang |
| 2010/0125911 A1 | 5/2010 | Bhaskaran |
| 2010/0138925 A1 | 6/2010 | Barai et al. |
| 2010/0154055 A1 | 6/2010 | Hansen |
| 2010/0211641 A1 | 8/2010 | Yih et al. |
| 2010/0235918 A1 | 9/2010 | Mizrahi et al. |
| 2010/0281536 A1 | 11/2010 | Richards et al. |
| 2010/0299292 A1 | 11/2010 | Collazo |
| 2011/0030059 A1 | 2/2011 | Greenwald |
| 2011/0055922 A1 | 3/2011 | Cohen et al. |
| 2011/0061089 A1 | 3/2011 | O'Sullivan et al. |
| 2011/0184877 A1 | 7/2011 | McHugh et al. |
| 2011/0238855 A1 | 9/2011 | Korsunsky et al. |
| 2012/0096553 A1 | 4/2012 | Srivastava et al. |
| 2012/0124671 A1 * | 5/2012 | Fritzson et al. ............. 726/26 |
| 2012/0311669 A1 | 12/2012 | Akase |
| 2013/0203023 A1 | 8/2013 | Sadeh-Koniecpol et al. |

OTHER PUBLICATIONS

"WhiteGold goes fishing for phishing", www.arnnet.com.au/article/299134/whitegold_goes_fishing_phishing/, accessed Jul. 23, 2013, 3 pages.

"United States Military Academies to Use PhishMe to Combat Spear Phishing", msmvps.com/blogs/donna/archive/2009/07/24/united-states-military-academies-to-use-phishme-to-combat-spear-phishing.aspx, accessed Jul. 24, 2013, 1 pg.

Bria Brian M. Bowen et al.,"Measuring the Human Factor of Cyber Security", Department of Computer Science Columbia University, 2011, 6 pages.

Aaron J. Ferguson, "Fostering E-Mail Security Awareness: The West Point Carronade", Educause Quarterly, No. 1, 2005, 4 pages.

Images from PhishMe Shockwave Animation (2008), 4 pages.

Jansson,Kenny, "A Model for Cultivating Resistance to Social Engineering Attacks", Dissertation, Sep. 2011, with attachments: a. Jansson, K, & von Solms, R., "Social Engineering: Towards a Holistic Solution," presented at the South African Information Security Multi-Conference, Port Elizabeth, South Africa (2010), b. Jansson, K, & von Solms, R., "Towards a Social Engineering Resistant User Model," presented at 13th Annual Conference on WWW Applications, Johannesburg, South Africa (2011), c. Jansson, K, & von Solms, R., "Simulating Malicious Emails to Educate End USers on-Demand".

"Anti-phishing training adds attachments to mix", www.networkworld.com/news/2009/090209-anti-phishing-training-adds-attachments-to.html, accessed Sep. 9, 2013, 3 pages.

"Core Impact penetration tester goes phishing", InfoWorld, Jan. 7, 2008, 2 pages.

"Core Impact 7.5", www.infoworld.com/print131390, SC Magazine, Aug. 2008, 1 page.

Victor Garza, "Product review: Core Impact penetration tester goes phishing", www.infoworld.com/print/31390, accessed Sep. 9, 2013, 3 pages.

Markus Jakobsson et al., "Designing Ethical Phishing Experiments: A study of (ROT13) rOnl query features", Indiana University, Bloomington, IN 47406, USA, WWW 2006, May 23-26, 2006, Edinburgh, Scotland, ACM 1595933239/06/0005., 10 pages.

"To defeat phishing, Energy learns to phish" , gcn.com/Articles12011/06/13/DOE-Phishing-Test.aspx?p=1, accessed Sep. 9, 2013, 3 pages.

"Humans are the Front Line' against Phishing for Intrepidus Group", blog.executivebiz.com/2010/03/humans-are-the-front-line-against-phishing-for-intrepidus-group/, accessed Sep. 9, 2013; 3 pages.

"InfoSec: 23 percent of users fall for spear phishing", www.scmagazine.com/infosec-23-percent-of-users-fall-for-spear-phishing/article/128480/#, accessed Sep. 9, 2013, 3 pages.

"Intrepidus Group and BrandProtect Partner to Offer Holistic Anti-Phishing Solution", www.redorbit.com/news/technology/1670312/intrepidus_group_and_brandprotect_partner_to_offer_holistic_antiphishing_solution/, accessed Sep. 9, 2013; 3 pages.

Ponnurangam Kumaraguru, "PhishGuru: A System for Educating Users about Semantic Attacks", 2009 dissertation, School of Computer Science, Institute for Software Research, Carnegie Mellon University, Pittsburgh, PA 15213, 198 pages.

Ponnurangam Kumaraguru et al, "Lessons From a Real World Evaluation of Anti-Phishing Training", Carnegie Mellon University, 14 pages.

"One-Quarter of Worldwide Population at Risk of Spear Phishing Attacks", www.certmag.com/read.php?in=5245, accessed Sep. 9, 2013, 2 pages.

Thomas Claburn, "Phish Your Colleagues With PhishMe", www.informationweek.com/security/client/phish-your-colleagues-with-phishme/209400255, accessed Sep. 9, 2013, 2 pages.

Jim Hansen, "Phishing for phishing awareness", 2011-2013, 18 pages.

16. "PhishMe.com Overview" (2010) (Filename: "PhishMe Information for DHS.pdf").

"Phishme.com Internal Communication" , ha.ckers.org/blog/20080306/phishmecom-internal-communication/, accessed Sep. 9, 2013, 5 pages.

Phishme,com, "Introduction to PhishMe.com", Nov. 2010, 15 pages.

(56) References Cited

OTHER PUBLICATIONS

Tom Olzak, "Phishme: The Easy Way to Enhance Employee Phishing Awareness", CISSP, updated: Jul. 4, 2011, www.brighthub.com/computing/enterprise-security/reviews/5298.aspx, accessed Sep. 9, 2013, 3 pages.

Lori Faith Cranor, "Can Phishing Be Foiled?", Scientific American, Dec. 2008, 7 pages.

"Social Phishing" Tom N. Jagatic, Nathaniel A. Johnson, Markus Jakobsson, Filippo Menczer Communications of the ACM, vol. 50 No. 10, pp. 94-100.

"Reduce the risk from targeted phishing and malware attacks. On demand.", Stratum Security, Jun. 2011, 2 pages.

"ThreatSim: Executive Summary", Stratum Security, 2011, 6 pages.

Steve Sheng et al., "Who Falls for Phish? A Demographic Analysis of Phishing Susceptibility and Effectiveness of Interventions", Carnegie Mellon University, Indraprastha Institute of Information Technology, ACM, Apr. 10-15, 2010, Atlanta, Georgia, USA,10 pages.

"An Empirical Evaluation of PhishGuruTM Embedded Training" Wombat Security Technologies, Apr. 2009, 12 pages.

"What is PhishMe?", Interpidus Group, 2009, 1 page.

Rohyt Belani, "Spear Phishing Train Your Workforce to Dodge the Hook" 2009, 26 pages.

"Phishing for user security awareness" Dodge, Ronald C.; Carver, Curtis; Ferguson, Aaron J. Computers & Security, vol. 26 (1), Elsevier, Feb. 1, 2007, 8 pages.

Alnajim, Abdullah, et al., "An Anti-Phishing Approach that Uses Training Intervention for Phishing Websites Detection," 2009 Sixth International Conference on Information Technology: New Generations, 2009, DD. 405-410, IEEE, USA.

Toolan, Fergus, et al., "Feature Selection for Spam and Phishing Detection," 2010 eCrime Researchers Summit, 2010, pp. 1-12, IEEE, USA.

Fette, Ian, et al., "Learning to Detect Phishing Emails," Carnegie Mellon Cyber Laboratory Technical Report CMU-CYLAB-06-012, Jun. 2006, pp. 1-12, Carnegie Mellon University, PA, USA.

Soni, Pravin, et al., "A Phishing Analysis of Web Based Systems," /CCCS'11 Feb. 12-14, 2011, Rourke/a, Odisha, India, 2011, pp. 527-530, ACM, USA.

Alnajim, A., et al., "An Approach to the Implementation of the Anti-Phishing Tool for Phishing Websites Detection," International Conference on Intelligent Networking and Collaborative Systems, 2009, p. 105-112, IEEE, USA.

He, Mingxing, et al., "An efficient phishing webpage detector," Expert Systems with Applications, 2011, pp. 12018-12027, vol. 38, Elsevier Ltd., UK.

Zhang, Yue, et al., "Cantina: A Content-Based Approach to Detecting Phishing Web Sites," Proceedings of the 16th International Conference on World Wide Web, May 8-12, 2007, Banff, Alberta, Canada, May 2007, pp. 639-648, ACM, USA.

Wenyin, Liu, et al., "Detection of Phishing Webpages based on Visual Similarity," 14th International Conference on World Wide Web, May 10-14, 2005, Chiba, Japan, DD. 1060-1061, ACM, USA.

Parno, Bryan, et al., "Phoolproof Phishing Prevention," CyLab Carnegie Mellon University, Dec. 3, 2005, 16 pages, Carnegie Mellon University, PA, USA.

Dhamija, Rachna, et al., "The Battle Against Phishing: Dynamic Security Skins," Symposium on Usable Privacy and Security (SOUPS) 2005, Jul. 6-8, 2005, Pittsburgh, PA, USA, 12 pages.

Huang, Chun-Ying, et al., "Using one-time passwords to prevent password phishing attacks," Journal of Network and Computer Applications, 2011, DD. 1-10, Elsevier B.V., NL.

Jackson, Collin, et al., "An Evaluation of Extended Validation and Picture-in-Picture Phishing Attacks," Financial Cryptography and Data Security, 2007, 13 pages, Springer-Verlag, DE.

Kang, Le, et al., "CAPTCHA Phishing: A Practical Attack on Human Interaction Proofing," Inscrypt 2009, LNCS 6151, 2010, pp. 411-425, Springer-Verlag, DE.

Dazeley, Richard, et al, "Consensus Clustering and Supervised Classification for Profiling Phishing Emails in Internet Commerce Security," PKAW 2010, LNAI 6232, 2010, pp. 235-246, Springer-Verlag, DE.

Jakobsson, Markus, "Modeling and Preventing Phishing Attacks," Lecture Notes in Computer Science, Indiana University at Bloomington, 2005, pp. 1-19, Bloomington, IN.

Dhamija, Rachna, et al., "Why Phishing Works," Proceeding of CHI-2006: Conference on Human Factors in Computing Systems, Apr. 2006, 10 pages.

Wu, Min, et al., "Do Security Toolbars Actually Prevent Phishing Attacks?," CHI 2006, Apr. 22-27, 2006, Montreal, Quebec, Canada, 2006, 10 pages, ACM, USA.

Zhang, Yue, et al., "Phinding Phish: Evaluating Anti-Phishing Tools," Proceedings of the 14th Annual Network and Distributed System Security Symposium (NOSS 2007), 2007, 16 pages.

Egelman, Serge, et al., "You've Been Warned: An Empirical Study of the Effectiveness of Web Browser Phishing Warnings," CHI 2008, Apr. 5-10, 2008, Florence, Italy, 2008, 10 pages, ACM, USA.

Downs, Julie, et al., "Decision Strategies and Susceptibility to Phishing," Symposium on Usable Privacy and Security (SOUPS), Jul. 12-14, 2006, Pittsburgh, PA, USA, 2006, 12 pages.

Wright, Ryan, et al., "The Influence of Experiential and Dispositional Factors in Phishing: An Empirical Investigation of the Deceived," Journal of Management Information Systems, Summer 2010, IPP. 273-303, vol. 27, No. 1, M.E. Sharpe, Inc., USA.

Sheng, Steve, et al., "Who Falls for Phish? A Demographic Analysis of Phishing Susceptibility and Effectiveness of Interventions," CHI 2010, Apr. 10-15, 2010, Atlanta, Georgia, USA, 2010, 10 pages, ACM, USA.

Vishwanath, Arun, et al., "Why do people get phished? Testing individual difference in phishing vulnerability within an integrated, information processing model," Decision Support Systems, 2011, IDD. 576-586, vol. 51, Elsevier B.V., NL.

Alnajim, Abdullah, et al., "An Evaluation of Users' Anti-Phishing Knowledge Retention," 2009 International Conference on Information Management and Engineering, 2009, pp. 210-214, IEEE, USA.

Sheng, Steve, et al., "Anti-Phishing Phil: The Design and Evaluation of a Game That Teaches People Not to Fall for Phish," Symposium on Usable Privacy and Security (SOUPS) 2007, Jul. 18-20, 2007, Pittsburgh, PA, USA, 2007, 12 pages.

Kumaraguru, Ponnurangam, et al., "Protecting People from Phishing: The Design and Evaluation of an Embedded Training Email System," Proceeding of the SIGCHI Conference on Human Factors in Computing Systems, Apr. 2007, pp. 1-10, ACM, USA.

Blom, Elma, et al., "Dummy auxiliaries in child and adult second language acquisition of Dutch," Lingua, 2011, pp. 906-919, vol. 121, Elsevier B.V., NL.

Radford, Andrew, et al., "On the Acquisition of Universal and Parameterised Goal Accessibility Constraints by Japanese Learners of English," Essex Research Reports in Linguistics, Mar. 2011, 46 pages (cover and second page, and DD. 1-44), vol. 60, No. 5, University of Essex, UK.

Dominiguez, Laura, et al., "Testing the Predictions of the Feature Assembly Hypothesis Evidence from the L2 Acquisition of Spanish Aspect Morphology," Proceedings of the Boston University Conference on Language Development, 2011, 14 pages, vol. 35, Cascadilla Press, MA, USA.

Bliton, Daniel, et al., "Unannounced Phishing Exercises and Targeted Training: Results and Lessons Learned," Interservice/Industry Training, Simulation, and Education Conference (11/TSEC), 2011, pp. 1-11, Paper No. 11342, I/ITSEC, USA.

Adams, Elizabeth, et al., "Brief Overview: Mandatory Training-A Systematic Review of Research NPL and Trends in Learning Organizations," Veterans Health Administration Office of Patient Care Services Technology Assessment Program, TAP Brief Overview, Mar. 2010, 23 pages (cover page, pp. i-iii, and pp. 1-19), VA Technology Assessment Program, Boston, MA, USA.

Ferguson, Aaron J., "Fostering E-Mail Security Awareness: The West Point Carronade," Educause Quarterly, 2005, pp. 54-57, vol. 28, No. 1, Educause Online Publication, http://www.educause.edu/eq.

(56) References Cited

OTHER PUBLICATIONS

Hidi, Suzanne, et al., "Strategies for increasing text-based interest and students' recall of expository texts," Reading Research Quarterly, Fall 1988, pp. 465-483, XX.111/4, International Reading Association, Delaware, USA.

Klevinsky, T. J., et al., Chapter 3—Penetration for Hire, Hack I. T.—Security Through Penetration Testing, 2002, DD. 25-27, Addison-Wesley Professional, Pearson Education Ltd, USA.

Sadoski, Mark, "Resolving the Effects of Concreteness on Interest, Comprehension, and Learning Important Ideas From Text," Educational Psychology Review, 2001, pp. 263-281, vol. 13, No. 3, Plenum Publishing Corporation, NY, USA.

Simulating malicious emails to educate end users on-demand, Jansson, Kenny; Von Solms, Rossouw, IEEE Symposium on Web Society, p. 74-80, 2011, ISSN: 21586985, E-ISSN: 21586993; ISBN-13: 9781457702112; 2011 3rd Symposium on Web Society, SWS2011, Oct. 26, 2011-Oct. 28, 2011, Institute for ICT Advancement, Nelson Mandela Metropolitan University, Port Elizabeth, South Africa.

School of phish: a real-world evaluation of anti-phishing training, Ponnurangam Kumaraguru; Justin Cranshaw; Alessandro Acquisti; Lorrie Cranor; Jason Hong; Mary Ann Blair; Theodore Pham, Carnegie Mellon University, SOUPS '09 Proceedings of the 5th Symposium on Usable Privacy and Security, Article No. 3, ISBN: 978-1-60558-736-3; doi:10.1145/1572532.1572536, 12 pages.

Design a mobile game for home computer users to prevent from "phishing attacks", Arachchilage, Nalin Asanka Garnagedara; Cole, Melissa, International Conference on Information Society, i-Society 2011, p. 485-489, 2011, ISBN-13: 9780956426383; Article No. 5978543, International Conference on Information Society, i-Society 2011, Jun. 27, 2011—Jun. 29, 2011, School of Information Systems, Computing and Mathematics, Brunel University, Uxbridge, Middlesex, United Kingdom.

Kumaraguru et al., "Lessons From a Real World Evaluation of Anti—Phishing Training", 14 pages.

Robertson, "Amid the VIPERS Establishing Malware's Position Within the Information Ecosystem", 54 pages.

Sheng et al., "Anti-Phishing Phil: The Design and Evaluation of a Game That Teaches People Not to Fall for Phish", 14 pages.

Spinapolice, "Mitigating the Risk of Social Engineering Attacks", 67 pages.

stratumsecurity.com, "Announcing ThreatSim—Stratum's Spear Phishing and Data Exfiltration SaaS Offering", 1 pg.

Tsow et al., "Deceit and Deception: A Large User Study of Phishing", 46 pages.

Wombat Security Technologies, "Wombat Security Technologies Offers Tips, Training, and Free Simulated Phishing Attacks to Help Companies and their Employees Avoid Holiday Phishing Scams", 3 pages.

Steve Sheng, Mandy Holbrook, Ponnurangam Kumaraguru, Lorrie Cranor, Julie Downs, "Who Falls for Phish? A Demographic Analysis of Phishing Susceptibility and Effectiveness of Interventions" CHI 2010, Apr. 10-15, 2010, Atlanta, GA, USA, 10 pages.

"Phishme: The Easy Way to Enhance Employee Phishing Awareness", http://www.brighthub.com/computing/enterprise-security/reviews/5298.aspx; accessed Jul. 23, 2013; 5 pages.

"What is PhishMe?", http://phishme.com/whatisphishme.html; accessed Jul. 23, 2013; 2 pages.

Aaron Higbee, "Phishme.Com—Techincal Paper", 2009, 10 pages.

Art Fritzson et al, U.S. Appl. No. 61/414,142, filed Nov. 16, 2010, "Phishing Awareness Training (PAT) Distinction Components" 39 pages.

Zhang et al., "CANTINA: A Content-Based Approach to Detecting Phishing Web Sites", WWW 2007 International World Wide Web Conference Committee (IW3C2), pp. 639-648 (May 2007).

Alnajim et al., "An Evaluation of Users' Anti-Phishing Knowledge Retention", 2009 International Conference on Information Management and Engineering, pp. 210-214 (2009).

Alnajim et al., "An Approach to the Implementation of the Anti-Phishing Tool for Phishing Websites Detection", 2009 International Conference on Intelligent Networking and Collaborative Systems, pp. 105-112 (2009).

PhishMe, http://www.Phishme.com/how_phishme_works.php, Dec. 4, 2011, 3 pgs.

PhishMe, http://www.phisme.com/what_is_phishme.php, Nov. 4, 2011, 3 pgs.

PhishMe, Phishme.com Internal Communication ha.ckers.org web application security lab, Mar. 6, 2008, 5 pgs.

\* cited by examiner

SIMULATED PHISHING ATTACK WITH SEQUENTIAL MESSAGES

RELATED APPLICATIONS

This application is a CONTINUATION of U.S. patent application Ser. No. 13/763,486, filed Feb. 8, 2013, and is also related to U.S. patent application Ser. No. 13/763,515, filed Feb. 8, 2013, and U.S. patent application Ser. No. 13/763,538, filed Feb. 8, 2013, the entire contents of each of which are incorporated herein by reference.

FIELD OF THE INVENTION

The present invention relates to methods, network devices and machine-readable media for performing simulated phishing attacks on individuals, and more specifically relates to simulated phishing attacks involving a plurality of messages presented in a sequential manner.

BACKGROUND

In a phishing attack, an individual (e.g., a person, an employee of a company, a user of a computing device) receives a message, commonly in the form of an e-mail, directing the individual to perform an action, such as opening an e-mail attachment or following (e.g., using a cursor controlled device or touch screen) an embedded link. If such message were from a trusted source (e.g., co-worker, bank, utility company), such action might carry little risk. Nevertheless, in a phishing attack, such message is from an attacker (e.g., an individual using a computing device to perform an malicious act on another computer device user) disguised as a trusted source, and an unsuspecting individual, for example, opening an attachment to view a "friend's photograph" might in fact install malicious computer software (i,e,. spyware, a virus, and/or other malware) on his/her computer. Similarly, an unsuspecting individual directed to a webpage made to look like an authentic login or authentication webpage might be deceived into submitting his/her username, password or other sensitive information to an attacker.

While there are computer programs designed to detect and block phishing emails, phishing attacks methods are constantly being modified by attackers to evade such forms of detection. The present invention addresses some shortcoming of previous attempts to counter phishing attacks.

SUMMARY OF THE INVENTION

The inventors have observed that one effective means to counter phishing attacks is to make individuals more knowledgeable about phishing attacks. In an education process, an individual is subjected to simulated phishing attacks, which are designed to resemble actual phishing attacks. Upon the individual falling prey to a simulated phishing attack, the individual is provided with training to decrease the likelihood that he/she will be deceived by a future simulated and/or real phishing attack. More specifically, the simulated phishing attack includes a sequence of messages being sent from a network device (e.g., server, cellphone base station, etc.) to at least one computing device of the individual (e.g., laptop, smartphone, desktop, etc.). One of the messages attempts to lure the individual into performing, on the at least one computing device, a target action associated with the message. Another one of the messages references the message with the target action, in an attempt to encourage the individual to perform the target action. These and further embodiments of the present invention are discussed herein.

BRIEF DESCRIPTION OF THE DRAWINGS

The present invention is illustrated by way of example, and not limitation, in the figures of the accompanying drawings in which.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The inventors have realized one effective means to counter phishing attacks is by launching simulated phishing attacks on individuals. Then, upon individuals falling prey to the simulated phishing attacks, training is immediately provided to the individuals to reduce the likelihood that they fall victim to future simulated and/or real phishing attacks and increase the likelihood that they will properly report suspected phishing attacks. The training might describe the mechanisms used by an attacker to masquerade as a trusted source (e.g., using official company logos, recalling a fictitious, yet plausible encounter with the individual, etc.), and further might describe the possible consequences of a phishing attack (e.g., installation of malware, identity theft, etc.) Such simulated phishing attacks and subsequent training might be particularly well suited for employees of a company, where real phishing attacks can cause considerable harm (e.g., financial harm, loss of privacy, etc.) to the company, its shareholders, its employees and/or its customers. Additionally, the responses of individuals (i.e., whether individuals recognized or failed to recognize one or more simulated phishing attacks) may be collected and analyzed in order to measure the overall performance of a group of individuals with simulated phishing attacks.

Figure 1:
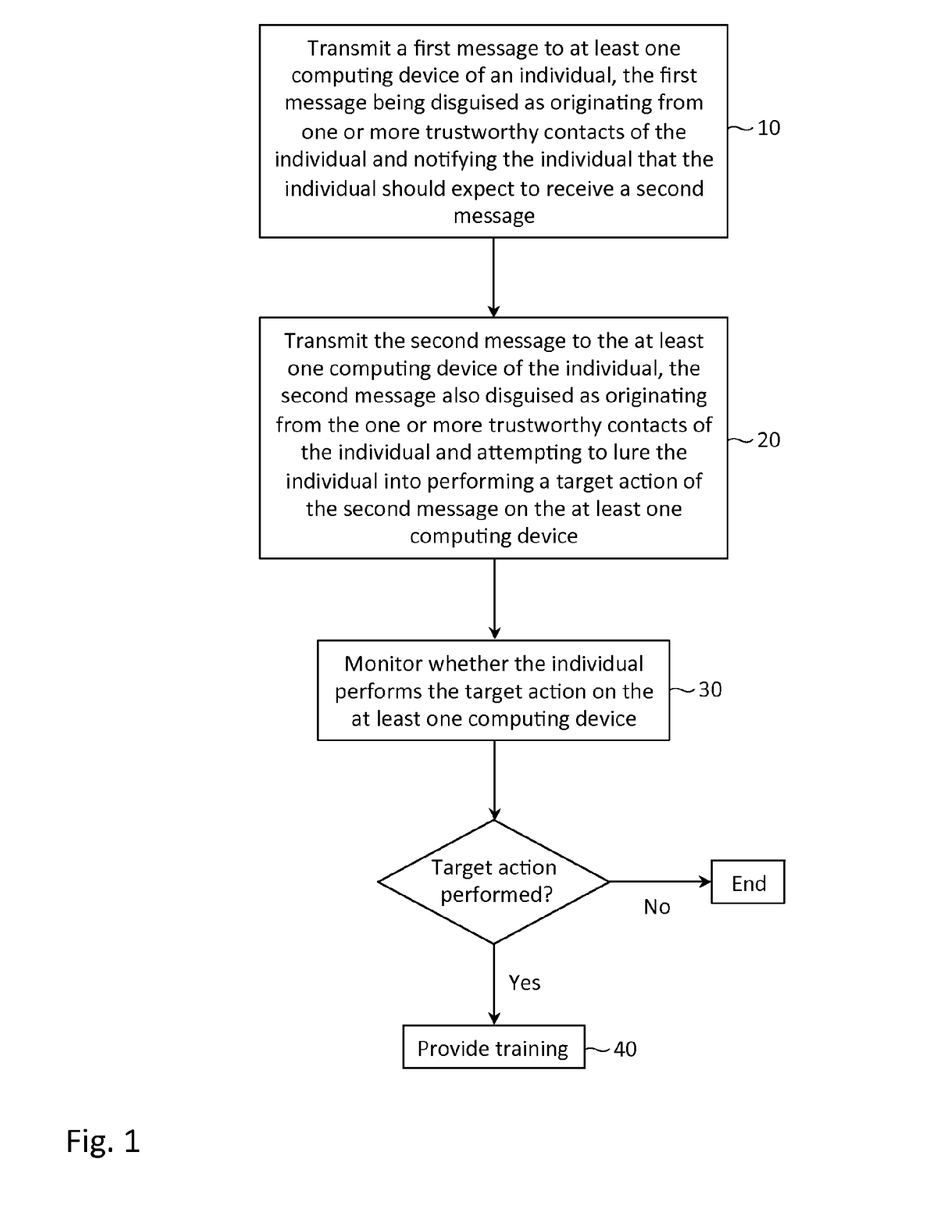
FIG. 1 depicts a flow diagram for conducting a simulated phishing attack and conditionally providing training to educate an individual about phishing attacks, according to one embodiment.

The education of one particular phishing attack involving a sequence of messages is a focus of the present application. In one embodiment of the invention, as depicted in FIG. 1, a network device (e.g., a server or other computing device) conducts a simulated phishing attack on a computing device of an individual. In the simulated phishing attack, the network device transmits (step 10) a first message to the computing device, which might be a desktop computer, a mobile computing device such as a smartphone, tablet computer or laptop computer, or a dumb terminal interfaced to a cloud computing system. Regardless of the specific computing device, the first message may be disguised as originating from one or more trustworthy and/or trusted contacts of the individual and may notify the individual that he/she should expect to receive a second message. Trustworthy contacts might include the individual's friends, family members, relatives and co-workers; banking and utility company representatives; people the individual may have met at a conference, etc. The first message might specifically target the individual (i.e., might be a personalized message, personalized using publicly obtained information) in order to gain the trust of the individual.

After a duration of time (which may be configurable), the network device transmits (step 20) a second message to a computing device of the individual. The second message may also be disguised as originating from one or more trustworthy and/or trusted contacts of the individual and may attempt to lure the individual into performing a target action of the second message. A target action may include opening an e-mail attachment, following an embedded link, replying to the second message, and/or navigating to a webpage where the individual is directed to submit sensitive information (e.g., social security number, birthday, etc). In contrast to a real phishing attack where the completion of a target action would likely compromise the individual's personal information and/or computing device, the completion of a target action in a simulated phishing attack results in no harm and/or adverse effects to the individual or his/her computing device.

In one embodiment, the second message may even be disguised as a message alerting the individual of a recent phishing attack, and attempt to lure the individual into reporting the purported phishing attack. For example, a message may read, "Automated security software has detected that the e-mail (forwarded below) may be a phishing attack. Its attachment has been blocked for your security. To report this phishing attack to IT personnel, please click the following link: www (dot) security (dot) com (slash)<phishing attack reporting>)". If this message were an actual phishing attack, clicking the link to report the suspected phishing attack may actually, ironically, result in an individual falling victim to a phishing attack. Therefore, a target action of a message may even be the reporting of a phishing attack or more generally the reporting of a message.

The network device continually monitors (step 30) whether the target action of the second message is performed by the individual. In one embodiment, the monitoring is performed with the assistance of java script executing on the computing device of the individual. Upon the individual performing the target action, the java script sends a message from the computing device of the individual to the network device, alerting the network device that the target action has been performed. Upon being notified that the individual has performed the target action, the network device immediately provides (step 40) the individual with training, as described above. In another embodiment, training material may be preloaded at the computing device, and upon the target action being performed at the computing device, training material may be immediately provided by the computing device to the individual without the assistance of the network device. The training may inform the individual that the first and second messages were part of a training exercise to educate the individual about phishing attacks.

The sequential nature of the messages is particularly enticing to an unsuspecting individual for several reasons, and hence, educating individuals to recognize, block and/or report these types of phishing attacks is beneficial. First, in the case of e-mails, a series of e-mails that make reference to one another may resemble an e-mail thread, which an individual may more typically associate with legitimate electronic communication. Second, the temporal aspect of the sequential message may exploit the memory lapses of an individual. By the time the individual receives the second message, he/she may only have a vague recollection of the first message. Rather than spending the time to locate and re-read the first message describing the context of, for instance, an attachment of the second message, the individual may be more inclined to just open the attachment in order to view the document, photo, electronic invitation, etc. described in the second message. Alternatively, due to a vague recollection of a first (earlier) message from the same sender, the individual may incorrectly assume that the second message has been sent from someone he/she knows (e.g., is a trustworthy contact), and perform the target action of the second message.

In one embodiment, the second message may refer to the first message so as to more clearly convey to the individual that the first and second messages are related to one another. For example, the second message may state, "This is a follow-up message to my earlier correspondence, and as promised, includes a copy of the presentation." Another way to convey a relationship between the first and second messages is to use one common sender identifier for both the first and second messages (e.g., send first and second e-mail messages with one common sender e-mail address). In another embodiment, the disguised identity of the sender could be varied between messages. For instance, a first message may be disguised as being sent from the CEO of a company, followed by a second message disguised as being sent from the secretary of the CEO.

Some specific examples are now provided for illustrative purposes. In one scenario, a simulated phishing attack might disguise the sender as a person the recipient has met at a recent event: "Dear Bob, it was great to meet you during the Tech Symposium. I would love to learn more about your company, and if the opportunity arises, to intern at your company. I am currently away from my computer, but will be sending you a copy of my CV shortly. Sincerely, Ann." The message can specifically mention a recent event attended by Bob, because Bob may have posted a notification on TWITTER®, FACEBOOK®, LINKEDIN®, FOURSQUARE® etc. that he attended the Tech Symposium. In a subsequent message, Bob may receive an e-mail with an attachment disguised as Ann's CV.

As another example, a simulated phishing attack might disguise the sender as a co-worker of the recipient. For example, a message might read, "Hey Bob, I'm currently away and don't have access to company e-mail, so I'm temporarily using my Gmail account. In a moment, I'll send you a copy of a presentation that I plan to give when I return. Cheers-Doug". In this example, the simulated phishing attack might rely upon publicly available information from, e.g., LINKEDIN® that Doug and Bob are co-workers. The message might be sent on a weekend so it is highly likely Doug is actually away from the office. Subsequently, a second message might be sent to Bob with an attachment disguised as Doug's presentation.

Figure 2:
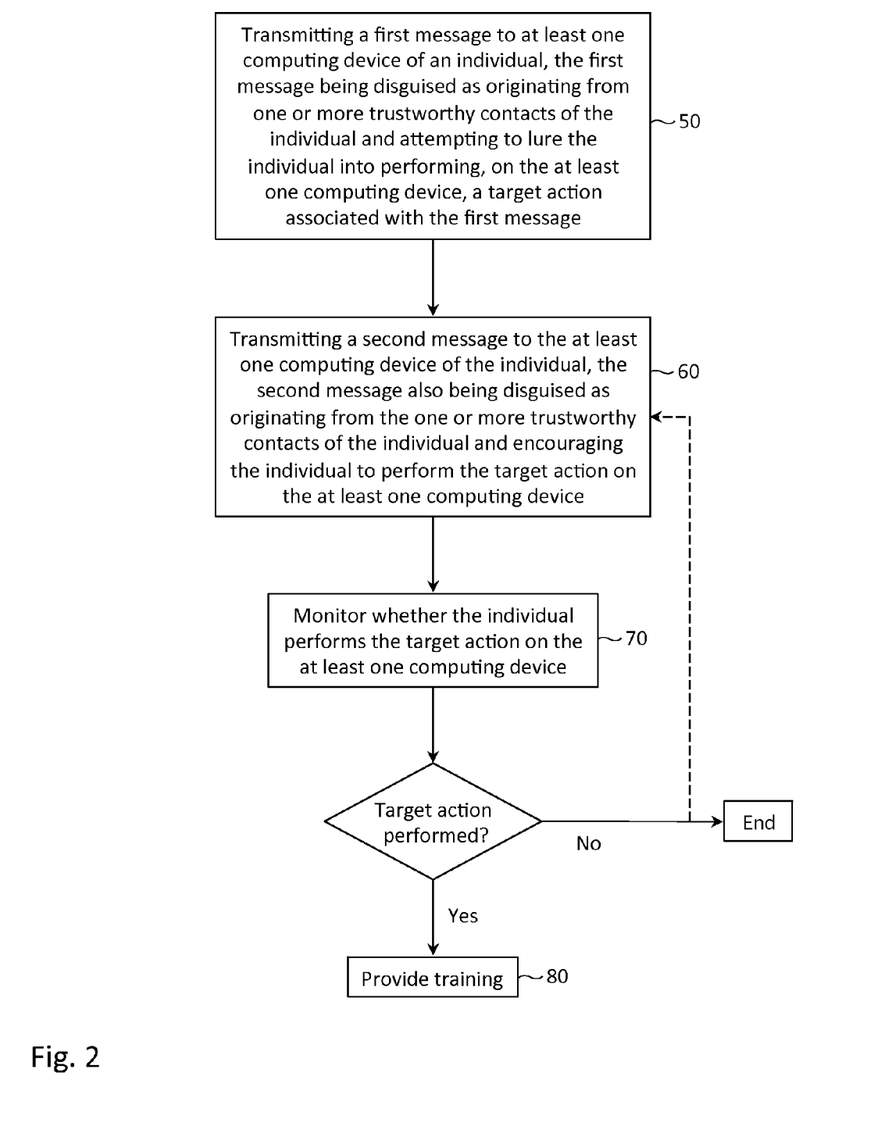
FIG. 2 depicts a flow diagram for conducting a simulated phishing attack and conditionally providing training to educate the individual about phishing attacks, according to another embodiment.

In another embodiment, as depicted in FIG. 2, the target action may be associated with the first message, instead of the second message. More specifically, the first message may be transmitted (step 50) with an attachment, an embedded link, or other graphical interface object, which when acted upon by the recipient of the message results in the execution of the target action associated with the first message. In some embodiments, there may be a series of graphical interface objects displayed to a user before the target action is completed by the individual. For instance, a first graphical interface object could be a link directing the individual to a website, followed by the second graphical interface object of a website containing textboxes for the individual to input his/her user name and password. A target action of the first message may also include one or more of sending a reply to the first message, and reporting the first message.

After a duration of time (which may be configurable), but before the individual performs the target action, a second message is transmitted (step 60) to draw attention to the first message. The second message might be a reminder conveying a sense of urgency for the individual to perform the action requested or suggested by the first message.

The network device continually monitors (step 70) whether the target action of the first message was performed by the individual. If so, the network device immediately provides (step 80) the individual with training, as described above. If the target action is not performed after a certain time duration, further reminder messages may be transmitted (step 60). Some specific examples are provided below for illustrative purposes.

For example, the first message might be a fraudulent message alerting an individual of suspicious activity associated with his/her network login account and might attempt to direct the individual to a website where he/she is asked to enter his/her network user name and password in order to review the suspicious activity. The message might read, "Dear Bob, We are concerned with some recent transactions associated with your network account. We suggest you to immediately review your recent transaction activity at the following website: www (dot) <corporate-it-security>(dot) com (slash) <suspicious-activity> If unauthorized activity is present, please contact a support representative". A second message might read, "Dear Bob, This is a reminder that we recommend you to review the recent suspicious network activity associated with your network account." If an individual were to actually select the embedded link, the individual may immediately be provided with training. In a variation, training may be provided after the individual actually navigates to a simulated bank website and submits his/her user name and password.

In another embodiment, one or more of the messages provided sequentially in a simulated phishing attack may have an associated target action. For example, a first target action may be associated with a first message and a second target action may be associated with a second message. The first message may reference the second message; the second message may reference the first message; or both messages may reference one another. The network device may monitor whether at least one of the first and second target actions are performed by the individual. If an individual performs one or more of the first and second target actions, the network device may provide the individual with training.

While the description has generally addressed a first and second message provided sequentially, it is understood that any number of messages may be transmitted sequentially, and one or more of the messages may have an associated target action. Any one of the messages may reference one or more of the other messages. Further, the network device may monitor whether any of the target actions are performed by the individual.

As a specific example, a first message may contain an embedded link disguised as a trustworthy link, and may be followed by a second message that contains an attachment disguised as a trustworthy attachment. For instance, the first message may contain an embedded link to a simulated organization IT security website and the second message, in addition to referencing the first message, may contain an attachment disguised as a report of recent suspicious activity.

As another example, a first message may contain a first attachment and request an individual (i.e., the recipient of the first message) to open it. A second message received by the individual may inquire whether the individual saw the first message, and provide a second attachment. A third message received by the individual may inquire whether the individual saw the first and/or second messages, and provide a third attachment. Further messages in a similar format may be transmitted to the individual. The various attachments may be identical to one another, may be related to one another, or may be unrelated to one another. The network device may monitor whether any one or more of the attachments were opened by the individual.

In another embodiment, a message with an associated target action may be preceded and followed by supporting messages designed to draw attention to the target action. For instance, a first message may read, "Dear Bob, Great meeting you at the TechWorld Conference. I have a product I have been researching that I think you might find interesting. As soon as I obtain permission from my colleagues, I will send you a brief description." The second message includes a graphical interface object (e.g., an attachment) and may read, "Dear Bob, Attached, please find a brief description of the product. My colleagues have requested, however, that you refrain from sharing the concept of our product with others." The third message may read, "Bob, Thanks in advance for reviewing our product description. I look forward to providing you with more details of our product." Similar to embodiments described above, the time duration between the transmissions of messages may be a configurable parameter.

In another embodiment, the delivery mechanism for messages may be varied within one simulated phishing attack. For instance, a first message may be delivered via a Short Message Service (SMS) text message, alerting the recipient of an e-mail to follow. A second message, delivered by e-mail, then follows the text message, requesting the individual to open an attachment, select an embedded link, etc. In another embodiment, the order of the text message and e-mail may be reversed. For instance, a message may be first delivered via e-mail, requesting the individual to open an attachment, select an embedded link, etc., followed by a SMS text message requesting the individual check his/her e-mail inbox for a specific e-mail requiring his/her attention.

In one embodiment, both the first and second messages may be delivered via SMS. More generally, both the first and second messages may be transmitted using a common electronic communication protocol. In another embodiment, the first message may be transmitted using a first electronic communication protocol and the second message may be transmitted using a second electronic communication protocol, the first protocol being different than the second protocol.

In addition to SMS text messages and e-mails, the first and second messages may be delivered via an instant messaging (IM) application, a webpage, a pop-up window, a blog, an Internet forum, a social network application (such as FACEBOOK®), and a voice over internet protocol (VOIP) application (such as SKYPE®).

In some embodiments, the process of sending the sequence of messages may be a completely automated process. In other words, a person conducting a simulated phishing attack need only input the recipient(s) of the phishing attack (e.g., recipient(s) name and/or contact information thereof), and possibly provide information associated with the recipient (etc., job title, place of employment, colleague name(s)) so that the phishing attack may be more personalized to the recipient. Afterwards, the messages are automatically sequentially transmitted to the recipient (at preset and/or random times) without further involvement from the person(s) and/or organization conducting the simulated phishing attack. Alternatively, each message may be manually transmitted by the person(s) and/or organization conducting the simulated phishing attack.

So far, embodiments have been discussed in which the second message is transmitted a certain time duration (whether configurable, random, etc.) after the first message (i.e., a time-based triggering mechanism for the second message). Alternatively, the second message may be transmitted in response to a certain action being performed in association with the first message (i.e., an action-based triggering mechanism for the second message). For instance the second message may be transmitted in response to one or more of the individual replying to the first message, opening the first message, opening an attachment of the first message, and following an embedded link of the first message.

Figure 3:
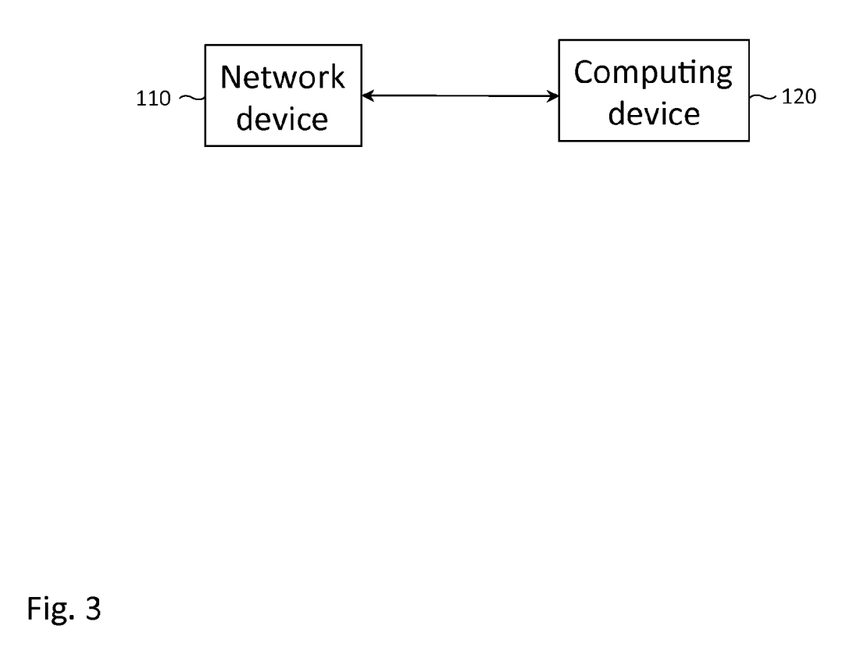
FIG. 3 depicts a system diagram with a network device communicatively coupled to a computing device, according to one embodiment.

FIG. 3 depicts components of a system in accordance with one embodiment. As discussed above, a network device 110 is interfaced with a computing device 120 of an individual. In a simulated phishing attack, network device 110 transmits a series of messages to computing device 120, and computing device 120 may send a message (e.g., message communicating whether target action was performed by the individual) to network device 110 in response to one or more messages of the phishing attack.

Readers should recognize that various embodiments of the present invention may be implemented with the aid of computer-implemented processes or methods (a.k.a. software, programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), JAVA™ and the like. In general, terms such as software, programs, routines, scripts and the like, as used herein, are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus (referred to above as a network device, computing device, etc.) to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions, and each coupled to a computer system bus, which in turn may be coupled to a processor.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with any computer system configuration, including personal computers, workstations, hand-held devices, multiprocessor systems, microprocessor-based, digital signal processor-based or other programmable consumer electronics, network computers that employ thin client architectures, minicomputers, mainframe computers, and the like. The invention can also be practiced in distributed computing environments where tasks are performed by remote processing devices that are linked through a communications network.

Thus, methods, network devices and machine-readable media for simulating a phishing attack with sequential messages have been described. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:
1. A method, comprising:
  conducting a simulated phishing attack, the simulated attack comprising:
    transmitting a first message to at least one of one or more computing devices of an individual, the first message being disguised as originating from at least one of one or more trustworthy contacts of the individual and notifying the individual that the individual should expect to receive a second message; and
    after transmitting the first message, transmitting the second message to at least one of the one or more computing devices of the individual, the second message also being disguised as originating from at least one of the one or more trustworthy contacts of the individual and attempting to lure the individual into performing, on at least one of the one or more computing devices, a target action associated with the second message,
    wherein if the individual performs the target action, the simulated phishing attack does not actually compromise any personal information or any one of the one or more computing devices of the individual; and monitoring whether the individual performs the target action on at least one of the one or more computing devices.

2. The method of claim 1, wherein the first and second messages are e-mails.

3. The method of claim 1, wherein the first message is a Short Message Service (SMS) message and the second message is an e-mail.

4. The method of claim 1, wherein the first and second messages are Short Message Service (SMS) messages.

5. The method of claim 1, wherein the first and second messages are transmitted using a common electronic communication protocol.

6. The method of claim 1, wherein the first message is transmitted using a first electronic communication protocol and the second message is transmitted using a second electronic communication protocol, the first protocol being different than the second protocol.

7. The method of claim 1, wherein the target action comprises one or more of opening an attachment, following an embedded link, replying to the second message, reporting the second message, and providing personal information.

8. The method of claim 1, wherein the second message is transmitted in response to an action performed in association with the first message.

9. The method of claim 8, wherein the action performed in association with the first message is one or more of replying to the first message, opening the first message, opening an attachment to the first message, and following an embedded link within the first message.

10. A method, comprising:
conducting a simulated phishing attack, the simulated attack comprising:
transmitting a first message to at least one of one or more computing devices of an individual, the first message being disguised as originating from at least one of one or more trustworthy contacts of the individual and attempting to lure the individual into performing, on at least one of the one or more computing devices, a target action associated with the first message; and
after transmitting the first message, transmitting a second message to at least one of the one or more computing devices of the individual, the second message also being disguised as originating from at least one of the one or more trustworthy contacts of the individual and encouraging the individual to perform the target action on at least one of the one or more computing devices,
wherein if the individual performs the target action, the simulated phishing attack does not actually compromise any personal information or any one of the one or more computing devices of the individual; and
monitoring whether the individual performs the target action on at least one of the one or more computing devices.

11. The method of claim 10, wherein the second message encourages the individual to perform the target action by reminding the individual that an action from the individual is requested in association with the earlier transmitted first message.

12. The method of claim 10, wherein the first message is transmitted using a first electronic communication protocol and the second message is transmitted using a second electronic communication protocol, the first protocol being different than the second protocol.

13. The method of claim 10, wherein the target action comprises one or more of opening an attachment, following an embedded link, replying to the first message, reporting the first message, and providing personal information.

14. A method, comprising:
conducting a simulated phishing attack, the simulated attack comprising:
transmitting a first message to at least one of one or more computing devices of an individual, the first message (i) referencing a second message that the individual should expect to receive after the first message, (ii) being disguised as originating from at least one of one or more trustworthy contacts of the individual, and (iii) attempting to lure the individual into performing, on at least one of the one or more computing devices, a first target action that is associated with the first message; and
after transmitting the first message, transmitting the second message to at least one of the one or more computing devices of the individual, the second message also being disguised as originating from at least one of the one or more trustworthy contacts of the individual and attempting to lure the individual into performing, on at least one of the one or more computing devices, a second target action that is associated with the second message,
wherein if the individual performs one or more of the first target action and the second target action, the simulated phishing attack does not actually compromise any personal information or any one of the one or more computing devices of the individual; and
monitoring whether the individual performs at least one of the first and second target actions on at least one of the one or more computing devices.

* * * * *